(12) United States Patent
Sgromo et al.

(10) Patent No.: US 8,654,422 B2
(45) Date of Patent: Feb. 18, 2014

(54) HOLOGRAPHIC BUBBLE GENERATING SYSTEM

(75) Inventors: Peter A. Sgromo, Alameda (CA); James C. Parr, Los Angeles, CA (US)

(73) Assignee: Imperial Toy, LLC, North Hills, CA (US)

( * ) Notice: Subject to any disclaimer, the term of this patent is extended or adjusted under 35 U.S.C. 154(b) by 379 days.

(21) Appl. No.: 12/898,539

(22) Filed: Oct. 5, 2010
(Under 37 CFR 1.47)

(65) Prior Publication Data

US 2011/0216385 A1 Sep. 8, 2011

Related U.S. Application Data

(60) Provisional application No. 61/249,085, filed on Oct. 6, 2009.

(51) Int. Cl.
*G02B 5/32* (2006.01)
(52) U.S. Cl.
USPC .............................................. 359/19; 472/57
(58) Field of Classification Search
None
See application file for complete search history.

(56) References Cited

U.S. PATENT DOCUMENTS

| | | | |
|---|---|---|---|
| 839,016 A | 12/1906 | MacDonald | |
| 3,711,183 A | 1/1973 | Braunhut | |
| 5,546,198 A | 8/1996 | van der Gracht et al. | |
| 6,452,699 B1 | 9/2002 | Athale et al. | |
| 6,825,959 B2 | 11/2004 | Kitamura | |
| 6,870,649 B2 | 3/2005 | Kitamura | |
| RE39,864 E | 10/2007 | Athale et al. | |
| 7,301,683 B2 | 11/2007 | Tanaka | |
| 2006/0152782 A1 | 7/2006 | Noda et al. | |
| 2007/0139744 A1* | 6/2007 | Argoitia et al. | 359/2 |
| 2007/0298674 A1* | 12/2007 | Ivanic et al. | 446/15 |
| 2008/0018859 A1 | 1/2008 | Gauger | |
| 2008/0174866 A1 | 7/2008 | Oliver | |
| 2008/0278807 A1 | 11/2008 | Richards et al. | |

OTHER PUBLICATIONS

High Pressure Optical Measurements of Sizes, Velocities and Longitudinal positions of Bubbles. Int. J. Multiphase Flow vol. 21, No. 1, pp. 95-105, 1995. H. Meng, P. Boot, C.W.M. Van der Geld.*
PCT International Search Report and Written Opinion on counterpart International Application No. PCT/US2010/051663 filed Oct. 5, 2010 by Applicant Imperial Toy LLC, dated Jan. 12, 2011.

* cited by examiner

*Primary Examiner* — Stephone B Allen
*Assistant Examiner* — Jyotsna Dabbi
(74) *Attorney, Agent, or Firm* — Novak Druce Connolly Bove + Quigg LLP

(57) ABSTRACT

An optical effect bubble generating system includes an optical effect viewing device including one or more desired holographic images. The optical effect viewing device can be eyeglasses having lenses containing the holographic images. The lenses can be interchangeable to provide different holographic images. The system includes a bubble generating device that can be manually- or automatically-operated. The system operates to provide the optical effect of imposing the desired holographic image onto one or more bubbles when the bubbles are generated in a naturally- or artificially-lit environment, and the one or more bubbles viewed by a user through the optical effect viewing device.

26 Claims, 2 Drawing Sheets

HOLOGRAPHIC BUBBLE GENERATING SYSTEM

CROSS-REFERENCE TO RELATED APPLICATIONS

This patent application claims priority from U.S. Provisional Patent Applications 61/249,085 filed on Oct. 6, 2009, which is herein incorporated by reference in its entirety.

FIELD OF THE INVENTION

This invention relates to a holographic bubble generating system which comprises a holographic viewing device, a bubble generating device and an optional light source. The holographic viewing device comprises a desired holographic image embedded or contained in the lenses. When the holographic viewing device is worn by the user and the user looks at the bubbles that are generated by the bubble generating device, the holographic images on the lenses appear on the bubbles.

SUMMARY OF THE INVENTION

In one embodiment, a holographic bubble generating system is disclosed. The holographic bubble generating system comprises a holographic viewing device and a bubble generating device. The holographic viewing device is preferably provided as a pair of eyeglasses which may be worn by a user. The eyeglasses comprise a frame and a lens having a holographic image embedded thereon. The lens may be interchangeable with any number of other lenses featuring different holographic images, thus allowing a user to select any number of desired holographic images to be viewed. The bubble generating device may be a manual or automatic device that generates one or a plurality of bubbles onto which the holographic images are projected thereon. The bubble generating device may optionally include a light source which projects a beam of light in the direction of the generated bubbles to enhance the user's visualization of the holographic images on the bubbles. A light source may also be separately provided from the bubble generating device, such as through a scene backdrop, e.g., using the sun.

In another embodiment, a virtual reality environment or game is provided utilizing the holographic bubble generating system. The virtual reality environment or game may be incorporated as part of a single- or multi-player game and may include a scene or themed backdrops configured to be supported by a wall or other support structure. Additional props may be provided to further enhance the virtual or fantasy environment. The scene backdrops and props may further include individual sources of lights embedded thereon such that the holographic images from the holographic viewing device are not only projected onto the bubbles, but also onto the embedded light sources. In a multi-player game, each player may be equipped with glasses having the same or different holographic images on the lens.

A more complete understanding of system and methods disclosed herein will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

Throughout the several figures and in the specification that follows, like element numerals are used to indicate like elements appearing in one or more of the figures.

DETAILED DESCRIPTION OF THE PREFERRED EMBODIMENTS

Disclosed herein are holographic bubble generating systems and methods for using the same in connection with the virtual and fantasy environments and games. The holographic bubble generating system allows a user wearing a holographic viewing device to perceive holographic images embedded on the lens on moving bubbles generated by a bubble generating device. The holographic bubble generating systems and methods are preferably used in connection with a natural light source or with an artificial light source which may optionally be projected from the bubble generating device.

Figure 1:
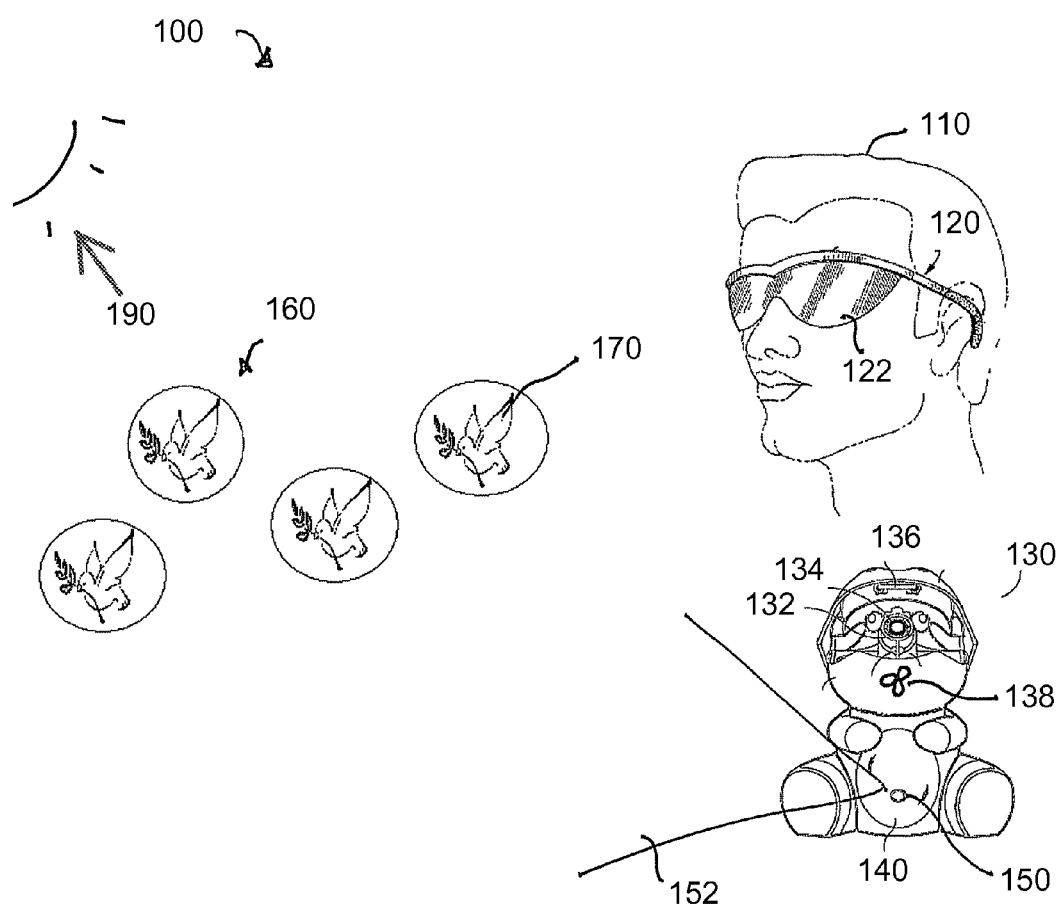
FIG. 1 depicts a preferred embodiment of a holographic bubble generating system including a holographic viewing device and a bubble generating device.

FIG. 1 depicts a preferred embodiment of a holographic bubble generating system 100. The holographic bubble generating system 100 generally comprises a holographic viewing device 120 that is worn by a user 110. The holographic viewing device 120 is preferably configured as a pair of eyeglasses having a lens 122 onto which a holographic image is embedded. Suitable holographic viewing eyeglasses are described in U.S. Pat. No. 5,546,198, which is incorporated by reference herein.

Figure 2:
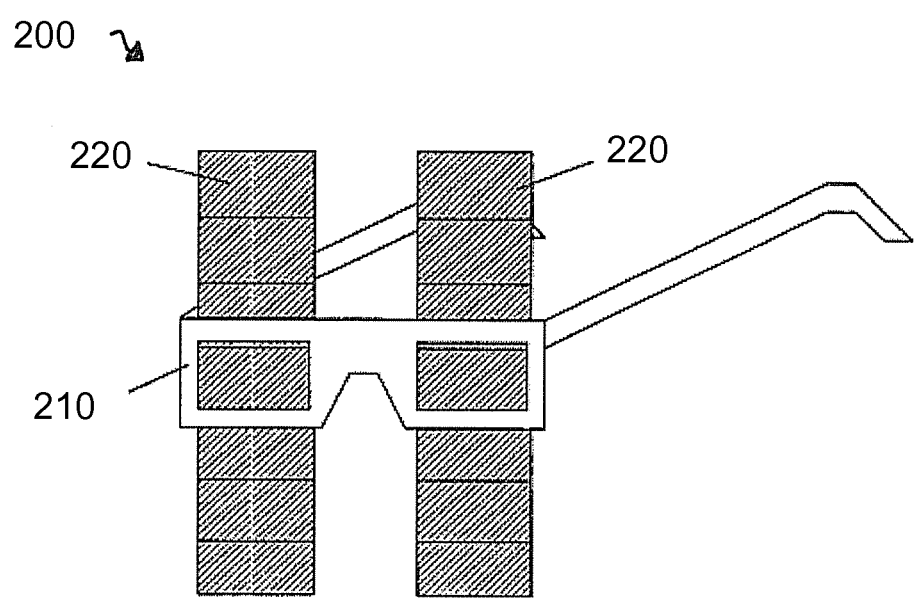
FIG. 2 depicts a preferred embodiment of a holographic viewing device having interchangeable lens.

As further shown in FIG. 2, the holographic viewing device 200 may have any number of interchangeable lenses 220 which may be fitted within the frame 210 of the eyeglasses 200. Each of the interchangeable lenses 220 may have different images featured thereon such that a user may select any number of desired images to be projected onto the bubbles. The interchangeable lenses 220 may be provided on a single sheet 220 as shown in FIG. 2 or they may be provided separately.

The holographic bubble generating system 100 further comprises a bubble generating device 130. Suitable bubble generating devices include both manual and automatic bubble generator devices.

Manual bubble toys include the conventional hand-held wand and bubble solution combination, in which a user dips a hand-held wand having a film holding portion, typically in the shape of a ring, into a bubble solution and blows air through the ring to generate one or more bubbles.

Automatic bubble generator toys include devices which typically integrate the wand and solution in a single device and utilize a motor to actuate the wand to dip into and out of a chamber containing the bubble solution. In an alternative embodiment, the motor may actuate a film creating member across a stationary wand to create a bubble producing film across the wand ring. The motor may also power a fan that causes a stream of air to be blown through the film holding portion of the ring to generate one or more bubbles.

The bubble generating device 130 depicted in FIG. 1 is an automatic bubble generating device comprising a stationary bubble wand 132 and a wiper blade 136 which moves across the bubble wand 132 to create a bubble solution film 134 across aperture. The bubble generating device 130 includes a motor (not depicted) which delivers the bubble solution from a chamber 140 to the bubble wand 132. The wiper blade 136 is actuated by hand across the bubble wand 132 to create the film. A fan 138 is further powered by the motor to expel a stream of air through the bubble wand 132 ring aperture to generate a plurality of bubbles 160. The mechanics of suitable bubble generating devices are described more fully in U.S. Pat. No. 7,470,165, which is incorporated by reference herein.

A light source may further be provided with the holographic bubble generating system. The light source may be a natural light source, such as sunlight 190. Alternatively, the light source may be integrated or separately provided with the bubble generating device 130. In FIG. 1, the bubble generating device 130 is shown with an integrated light source 150 which is projects a beam of light 152 in the same general area in which the bubbles are being projected. The combination of the light 152 or 190 and the bubbles 160 allows the user 110 to perceive the holographic images 170 from the lens 122 projected onto the individual bubbles 160 when viewed through the holographic viewing device 120.

The holographic bubble generating device may be used in connection with virtual and fantasy environments and games. To that end, the holographic bubble generating device may be provided with accessories, such as a scene or themed backdrop which may be supported by a wall or other support structure. The scene backdrops may further include individual sources of lights embedded thereon such that the holographic images from the holographic viewing device are not only projected onto the bubbles, but also onto the light sources. In a multi-player game, multiple players may be equipped with glasses, each provided with different images.

Having thus described preferred embodiments for a holographic bubble generating system, it should be apparent to those skilled in the art that certain advantages of the within methods and systems have been achieved. It should also be appreciated that various modifications, adaptations, and alternative embodiments thereof may be made without departing from the scope and spirit of the present technology.

What is claimed is:

1. An optical effect bubble system comprising;
   an optical effect viewing device comprising one or more holographic images;
   a bubble generating device for generating one or more bubbles; and
   wherein the one or more generated bubbles appear to have the one or more holographic images thereon when lit by a light source and viewed through the optical effect viewing device.

2. The bubble system as recited in claim 1 wherein the optical effect viewing device comprises a pair of eyeglasses worn by a user and having lenses with the one or more holographic images.

3. The bubble system as recited in claim 2 wherein the eyeglasses include a number of interchangeable lenses having different holographic images.

4. The bubble system as recited in claim 1 wherein the bubble generating device is a manually-operated device comprising a wand and a bubble solution.

5. The bubble system as recited in claim 1 wherein the bubble generating device is automatically-operated comprising a bubble solution and means for forming a bubble, wherein operation of the device by a user causes the device to form a bubble.

6. The bubble system as recited in claim 5 wherein the bubble generating device further comprises an air blowing means for passing air out of the device when the device is operated by a user.

7. The bubble system as recited in claim 5 wherein the device comprises a wiper blade.

8. The bubble system as recited in claim 5 further comprising a wand.

9. The bubble system as recited in claim 1 further comprising a light source for lighting the one or more bubbles.

10. The bubble system as recited in claim 9 wherein the light source is sunlight.

11. The bubble system as recited in claim 9 wherein the light source is part of the bubble generating device.

12. The bubble system as recited in claim 1 further comprising a portable backdrop element including theme or scene artistry.

13. The bubble system as recited in claim 12 wherein the light source is part of the backdrop.

14. The bubble system as recited in claim 12 comprising a number of optical effect viewing devices worn by different users.

15. An optical effect bubble system comprising;
    a pair of eyeglasses having lenses comprising one or more holographic images; and
    a device for making one or more bubbles;
    wherein the bubbles appear to have the one or more holographic images thereon when lit by a light source and viewed through the eyeglasses.

16. The bubble system as recited in claim 15 wherein the device for making one or more bubbles is manually-operated and comprises a wand and a bubble solution.

17. The bubble system as recited in claim 15 wherein the device for making one or more bubbles is automatically-operated and comprises a wand and a bubble solution, wherein operation of the device by a user causes the wand to receive the bubble solution for forming a bubble.

18. The bubble system as recited in claim 15 further comprising a light source.

19. The bubble system as recited in claim 18 wherein the light source is combined with the device for making one or more bubbles.

20. An optical effect bubble system comprising;
    a viewing device having a holographic lens that provides a holographic image; and
    a device for making one or more bubbles;
    wherein the bubbles appear to have the holographic image thereon when lit by a light source and viewed through the viewing device.

21. A method for creating an optical effect on one or more bubbles comprising the steps of:
    generating one or more bubbles in a lit environment; and
    viewing the one or more bubbles through an optical effect device comprising a holographic lens that provides a holographic image;
    wherein the one or more bubbles as viewed through the optical effect device appear to have the holographic image.

22. The method as recited in claim 21 wherein the step of generating one or more bubbles comprises using a manually-operated device comprising a wand and a bubble solution.

23. The method as recited in claim 21 wherein the step of generating one or more bubbles comprises using an automatically-operated device comprising means for creating a bubble and a bubble solution, wherein operation of the device by a user produces a bubble.

24. The method as recited in claim 21 wherein the lit environment is provided by natural sunlight.

25. The method as recited in claim 21 wherein the optical effect device comprises a pair of eyeglasses.

26. The method as recited in claim 25 wherein the eyeglasses comprises holographic lens.

* * * * *